United States Patent [19]

Andre et al.

[11] 4,287,657

[45] Sep. 8, 1981

[54] UPHOLSTERY BUTTON AND METHOD OF ASSEMBLY

[75] Inventors: Guy Andre; Gilbert Besson, both of Grenoble, France

[73] Assignee: A. Raymond, Lorrach, Fed. Rep. of Germany

[21] Appl. No.: 86,790

[22] Filed: Oct. 22, 1979

[30] Foreign Application Priority Data

Oct. 21, 1978 [DE] Fed. Rep. of Germany ....... 2845939

[51] Int. Cl.[3] ............................................ B23P 11/02

[52] U.S. Cl. ........................................ 29/450; 29/525; 24/216; 24/213 R

[58] Field of Search .................... 29/450, 525; 24/216, 24/213 R

[56] References Cited

U.S. PATENT DOCUMENTS

| | | | |
|---|---|---|---|
| 574,267 | 12/1896 | Pringle | 24/216 |
| 707,054 | 8/1902 | Dowse | 24/213 R |
| 3,049,777 | 8/1962 | Lewin | 24/213 R |

*Primary Examiner*—James L. Jones, Jr.
*Attorney, Agent, or Firm*—Finnegan, Henderson, Farabow, Garrett

[57] ABSTRACT

An upholstery button including a cap and a lower part adapted to be joined together. The button is adapted to press and hold a cover fabric against a padding and the lower part includes means which anchors to the padding. The cap and lower part are secured to the cover fabric so that it covers the cap and forms radial folds outwardly of the button. The method of assembly facilitates assembly of several upholstery buttons to the cover fabric in one operational stage.

4 Claims, 7 Drawing Figures

UPHOLSTERY BUTTON AND METHOD OF ASSEMBLY

BACKGROUND OF THE INVENTION

The invention relates to an upholstery button for pressing and retaining a cover fabric against a layer of padding, and to the method of assembling the upholstery button to the fabric and padding layer.

When covering padded parts such as seat benches and backs in automobiles, the cover fabric first is tensioned over the padding and then fastened by upholstery buttons at several uniformly distributed places. The upholstery buttons are provided with a fastening element which may consist of a shank of a length corresponding to the thickness of the padding and having barbs near one end. This fastening element is pressed through the fabric and the padding as far as the padding base and anchored in corresponding holes in the base. Depending on the nature of the upholstery material, the barbs also may dig into the lower level of the padding which further assists in providing the required anchoring.

To provide a better appearance, the upholstery buttons are covered at their top or exposed end with the same fabric that covers the padding. To that end, use is made ordinarily of upholstery buttons of two parts including a cap surrounded by a small fabric piece, and a lower part with the fabric which covers the padding clamped between the rim of the cap and the lower part.

This kind of upholstery button is complex and expensive in that it requires complex assembly techniques and additional fabric. Therefore, there is a need for a fabric covered upholstery button in which the fabric covering step can be carried out more efficiently and hence more economically.

SUMMARY OF THE INVENTION

To solve this problem, the present invention proposes to connect the cap and the lower part of the upholstery button with the cover fabric in such a manner that the same piece of fabric, which covers the padding also covers the upholstery button cap. Also in accordance with the invention, the fabric is formed with an inwardly protruding pleat in the area of the upholstery button which is clamped between the rim of the cap and the lower part.

The upholstery button and method of assembly of the invention not only solve the described problems in a simple manner, but at the same time make it possible to mount a plurality of upholstery buttons at predetermined locations on the fabric, whereby the buttons are preassembled to the cover fabric which is then placed on the padding and fastened to the padding. In this manner the fastening of the cover to the padding is substantially simplified.

An additional feature of the upholstery button of this invention is that the rim of the cap is equipped with barbs which dig into the pleat in the fabric material. Alternatively, the cap can press the fabric pleat into a groove in the lower part of the button. In both cases, this secures the fabric pleat to the upholstery button and prevents it from subsequently becoming loose.

In the method of this invention, a plurality of upholstery buttons can be fastened to the cover fabric simultaneously in one operational stage.

It will be appreciated that a variety of materials can be employed as the cover so long as the material has the required elasticity for carrying out the method. For example, textile materials and synthetic leathers can be used as the cover material.

Further objects and advantages of this invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, an upholstery button for pressing a cover fabric against a padding including a padding base, comprises an upper part or cap covered by the cover fabric, the upholstery button including a lower part which can be assembled to the cap, the lower part having on its side opposite the cap a fastening means for anchoring into the padding base, the cap and the lower part of the upholstery button being so connected with the cover fabric that the cover fabric covers the cap and is formed with an inwardly projecting pleat which is clamped between a rim of the cap and the lower part.

In another aspect, the present invention includes the method of assembling an upholstery button to a cover fabric which comprises the steps of depositing the cover fabric on a die having a die opening, positioning a cap of the upholstery button with its top side on the cover fabric and moving the cap and the cover fabric into the die opening to form an arcuate pleat in the cover fabric extending inwardly of the rim of the cap, positioning a lower part of the upholstery button under slight pressure on the cover fabric around the rim of the die opening, pressing the cap toward the lower part to clamp the fabric pleat against the lower part, and connecting the cap and lower part together.

OF THE DRAWINGS

DETAILED DESCRIPTION

Figure 1:
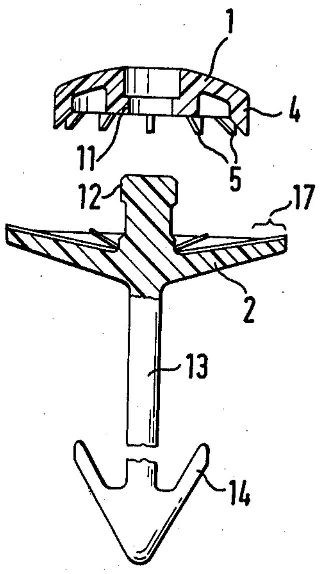
FIG. 1 is an exploded view, partly in section, showing a preferred form of a two-part upholstery button embodying the present invention.

Upholstery buttons of this invention and shown in the drawings are used, for example, to press and retain cover fabric on the padding of benches and backs of seats in automotive vehicles. In a preferred form of this invention shown in FIG. 1, there is shown an upholstery button which includes upper part or cap 1 and a lower part 2 having a saucer-like annular flange. Lower part 2 is preferably made of plastic and is adapted to interconnect with cap 1 by means of a locking connection 11, 12 in the manner of a snap button. Depending on the stress to be exerted on the button, i.e., on the strength of the cover fabric, cap 1 may be made of plastic (FIG. 1), or metal (FIG. 2).

The lower part 2 is provided on its side away from the locking connection 12 with a shank 13 which includes at least two outwardly extending barbs 14 at its end. As shown in FIG. 2, the barbs 14 anchor the lower part 2 of the upholstery button into a padding base 16 after the cover fabric 3 is firmly pressed against a padding 15. Depending on the strength of the padding 15, the barbs 14 may also be anchored in the lower region of the padding 15, in which case the shank 13 can be provided with several more barbs 14. See FIGS. 3 and 4.

Figure 2:
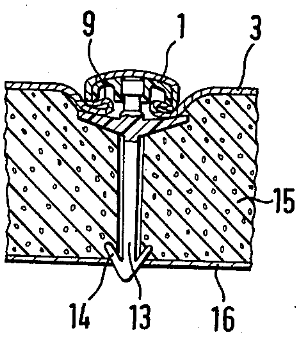
FIG. 2 is a view of a slightly modified version of the upholstery button of FIG. 1, shown in the assembled state on a fabric cover and padding layer.
Figure 4:
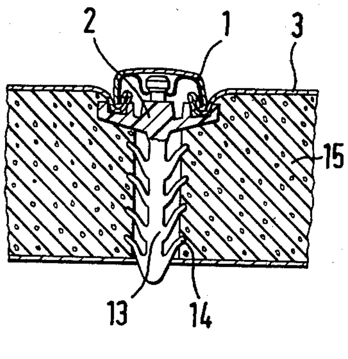
FIG. 4 is a view showing the upholstery button of FIG. 3 in the assembled state.

In accordance with the invention and as shown in FIGS. 2 and 4, the upholstery buttons are so connected with the cover fabric 3 that the fabric is clamped with a projecting pleat 9 between a rim 4 of the cap 1 and the lower part 2 while the cover fabric also covers the cap 1. To that end the lower part 2 annular flange has a surface 17 which projects radially beyond cap rim 4 so that the cover fabric 3 will be annularly supported outside the rim 4 of the cap 1. Cap rim 4 may also be provided with barbs 5 to better hold the clamped fabric pleat 9, the barbs 5 solidly digging into the cover fabric 3 when the parts are assembled (FIG. 2).

Figure 3:
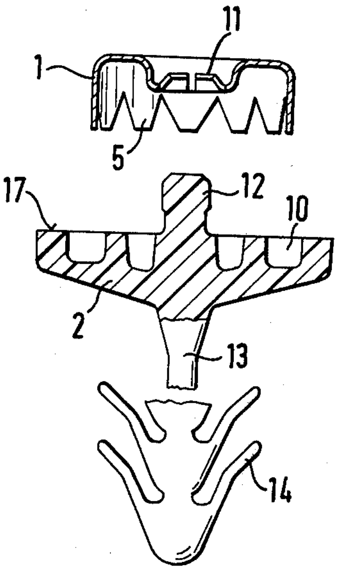
FIG. 3 is a view similar to FIG. 1 showing a still further modified form of upholstery button.

In the embodiment of FIGS. 3 and 4, a concentric groove 10 is provided in the annular flange on the lower part 2. The groove 10 is of such a width that the rim 4 of the cap surrounded by the pleat 9 and fabric 3 fully extends into the groove 10 when the parts are assembled (FIG. 4). This groove 10 on one hand insures satisfactory retention of the cover fabric 3 in place between the parts 1, 2 and on the other hand allows the cover fabric 3 to first rise around the cap rim 4 and then continue radially outwardly with decorative radial folds in the region of the rim.

Figure 5:
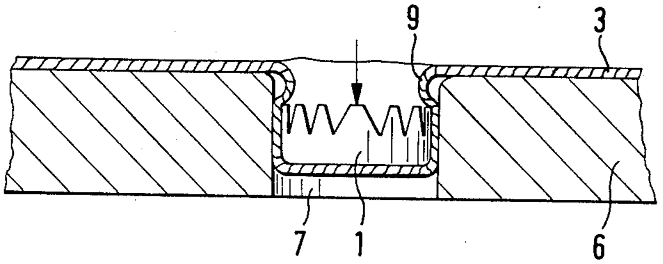
FIGS. 5–7 are sequential views illustrating the method of this invention shown with the upholstery button of FIGS. 3 and 4.
Figure 6:
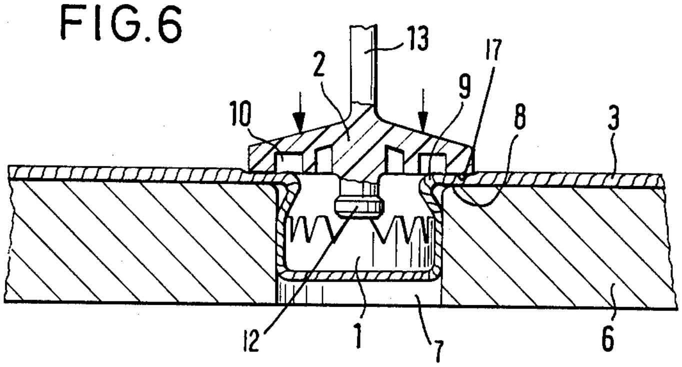
Figure 7:
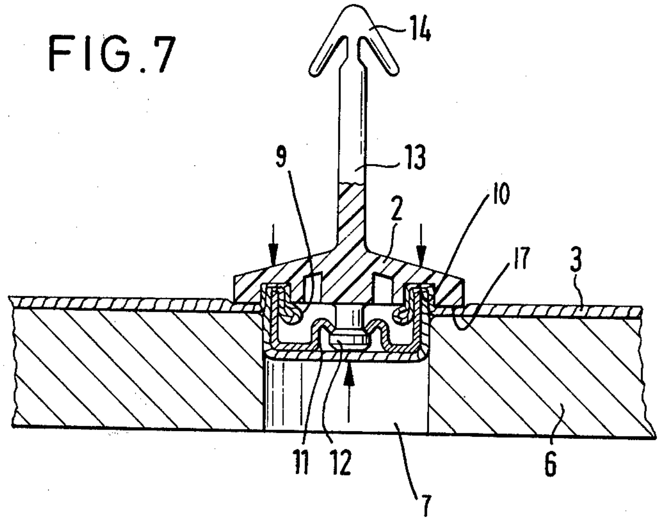

FIGS. 5–7 illustrate the procedural steps included in the method of this invention using the upholstery button of FIGS. 3 and 4. As shown in FIG. 5, the cover fabric 3 initially is placed on a die 6 and the top side of cap 1 is pushed against the fabric 3 and into an opening in the die 6 until an inside arcuate pleat 9 is formed in the fabric. In the next stage, shown in FIG. 6, the lower part 2 of the upholstery button is placed against the cover fabric 3 under slight pressure in the direction of the arrows with the annular surface 17 pressing the fabric 3 against a rim 8 around the die opening 7. In the third stage, shown in FIG. 7, the cap 1 is moved toward the lower part 2 by suitable means and is pressed against it. This causes the fabric pleat 9 to be clamped between the cap rim 4 and the groove 10, and the locking connection 11, 12, in the manner of a snap button, to be made. It should be noted that in lieu of the snap-type connection 11, 12, other locking means such as rivets may also be used.

The fastening of the upholstery buttons to the cover fabric 3 may be implemented in an especially efficient manner using a die 6 which includes a plurality of die openings 7 positioned according to the desired locations for fasterning the cover 3 to the padding 15. In this manner, a plurality of upholstery buttons can be fastened sequentially, or simultaneously to the cover fabric 3 in one operational stage.

It will be apparent to those skilled in the art that various additions, substitutions, modifications and omissions can be made to the upholstery buttons and method of assembly of this invention without departing from the spirit of the invention.

We claim:

1. An upholstery button for pressing a cover fabric against a padding including a padding base comprising an upper part or cap covered by said cover fabric, a lower part assembled to said cap, said lower part having on its side opposite said cap a fastening means for anchoring into the padding base, said cap and lower part of the upholstery button being so connected with said cover fabric that said cover fabric covers said cap and is formed with a projecting pleat which is clamped between a rim of said cap and said lower part.

2. The upholstery as claimed in claim 1, wherein said rim of said cap is provided with barbs which dig into said fabric cover when the parts are assembled.

3. The upholstery button as claimed in either claim 1 or claim 2, wherein said rim of said cap is surrounded by said fabric pleat and said fabric cover is embedded into a groove in said lower part.

4. The method of assembling an upholstery button to a cover fabric, comprising the steps of depositing the cover fabric on a die having a die opening, positioning a cap of the upholstery button with its top side on the cover fabric and moving said cap and cover fabric into the die opening to form an arcuate pleat in said cover fabric extending inwardly of said rim of said cap, positioning a lower part of said upholstery button under slight pressure on said cover fabric around the rim of the die opening, pressing said cap toward said lower part to clamp said fabric pleat against said lower part, and connecting said cap and lower part together.

* * * * *